(12) United States Patent
Langbein et al.

(10) Patent No.: US 10,581,477 B2
(45) Date of Patent: Mar. 3, 2020

(54) REMOTE ANTENNA FOR CAR-TO-CAR (C2C) OR CAR-TO-X (C2X) COMMUNICATION

(71) Applicant: HIRSCHMANN CAR COMMUNICATION GmbH, Neckartenzlingen (DE)

(72) Inventors: Christian Langbein, Grossbettlingen (DE); Florian Storch, Kuenzell (DE); Michael Faust, Grossenlueder (DE)

(73) Assignee: HIRSCHMANN CAR COMMUNICATION GMBH, Neckartenzlingen (DE)

( * ) Notice: Subject to any disclaimer, the term of this patent is extended or adjusted under 35 U.S.C. 154(b) by 0 days.

(21) Appl. No.: 15/512,845

(22) PCT Filed: Oct. 19, 2015

(86) PCT No.: PCT/EP2015/074106
§ 371 (c)(1),
(2) Date: Apr. 10, 2017

(87) PCT Pub. No.: WO2016/062651
PCT Pub. Date: Apr. 28, 2016

(65) Prior Publication Data
US 2017/0294930 A1    Oct. 12, 2017

(30) Foreign Application Priority Data
Oct. 20, 2014  (DE) .................. 10 2014 115 254

(51) Int. Cl.
*H04B 1/18* (2006.01)
*H04B 1/16* (2006.01)
*H04B 1/3805* (2015.01)
*H04B 1/3822* (2015.01)
(Continued)

(52) U.S. Cl.
CPC ............. *H04B 1/1607* (2013.01); *H04B 1/18* (2013.01); *H04B 1/3805* (2013.01); *H04B 1/3822* (2013.01); *H04B 1/48* (2013.01); *H04B 1/525* (2013.01)

(58) Field of Classification Search
CPC .......... H01Q 11/12; H01Q 1/32; H04B 1/005; H04B 1/26; H04B 1/38; H04W 72/0453; H04W 74/00
See application file for complete search history.

(56) References Cited

U.S. PATENT DOCUMENTS

| 5,737,687 A | 4/1998 | Martin |
| 9,025,644 B2 * | 5/2015 | Arkhipenkov ......... H04B 7/155 375/219 |
| 9,130,605 B2 | 9/2015 | Hsu |

(Continued)

*Primary Examiner* — Joseph J Lauture
(74) *Attorney, Agent, or Firm* — Andrew Wilford

(57) ABSTRACT

Antenna device (1) and method for operating same, comprising an antenna (2), wherein the antenna (2) is connected to an electronic device (4) via an antenna cable (3) and high-frequency signals are transmitted via the antenna cable (3) between the electronic device (4) and the antenna (2) and vice versa, characterized in that the antenna device (1) has a control unit (5) and switch units (6, 7) which are controlled by the control unit (5), wherein the switch units (6, 7) are switched between a receiving path (8) and a transmission path (9) between the electronic device (4) and the antenna (2).

3 Claims, 1 Drawing Sheet

(51) Int. Cl.
*H04B 1/48* (2006.01)
*H04B 1/525* (2015.01)

(56) References Cited

U.S. PATENT DOCUMENTS

| | | | |
|---|---|---|---|
| 9,191,903 B2 | 11/2015 | Sasson | |
| 2010/0091752 A1* | 4/2010 | Kemmochi | H03H 7/09 |
| | | | 370/339 |
| 2010/0149042 A1* | 6/2010 | Utsi | H01Q 1/273 |
| | | | 343/700 MS |

* cited by examiner

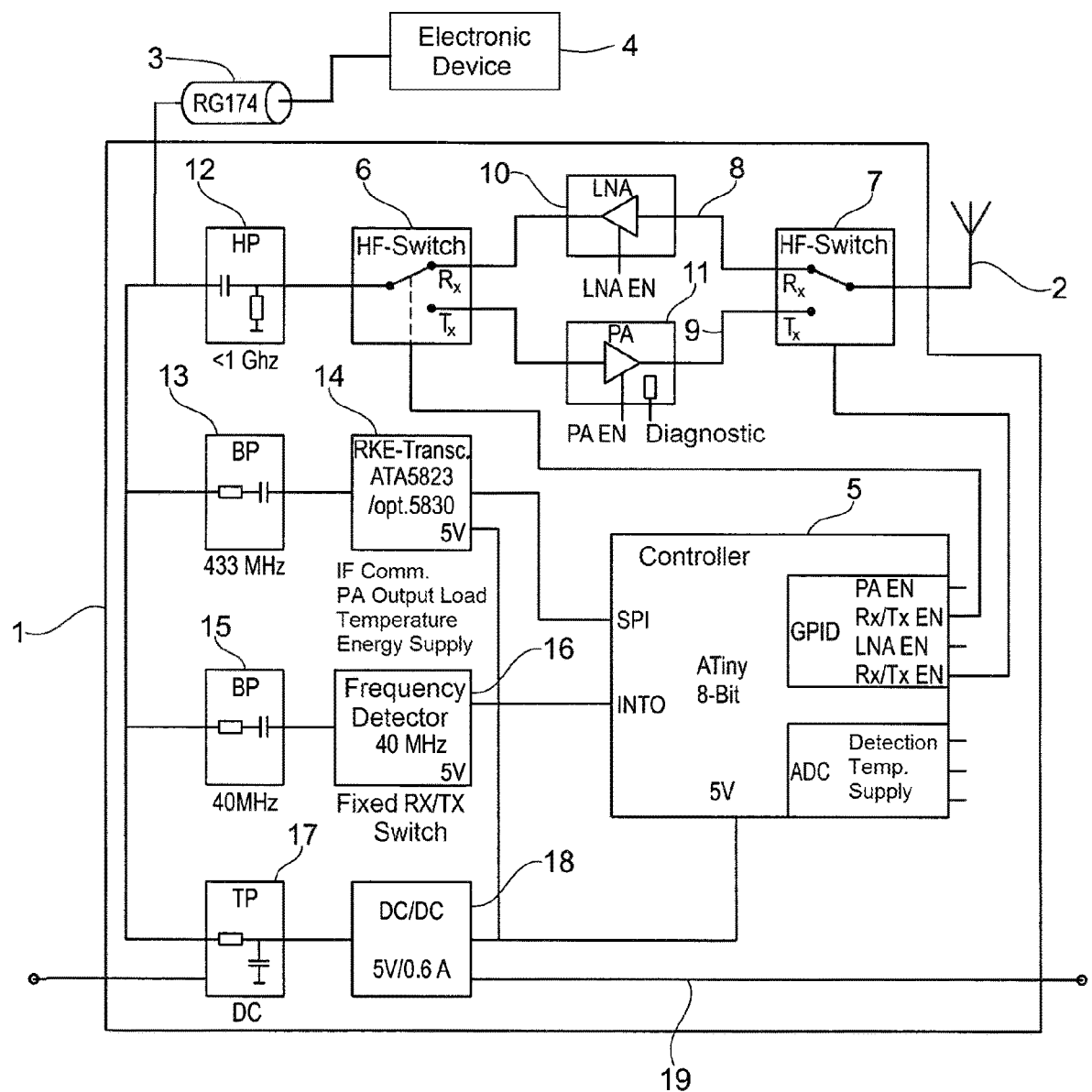

REMOTE ANTENNA FOR CAR-TO-CAR (C2C) OR CAR-TO-X (C2X) COMMUNICATION

CROSS REFERENCE TO RELATED APPLICATIONS

This application is the US-national stage of PCT application PCT/EP2015/074106 filed 19 Oct. 2015 and claiming the priority of German patent application 102014115254.9 itself filed 20 Oct. 2014.

FIELD OF THE INVENTION

The invention relates to an antenna system and a method of operating such an antenna system having an antenna in which an antenna is connected to an electronic device via an antenna cable and high-frequency signals are transmitted between the electronic device and the antenna and vice versa via the antenna cable.

BACKGROUND OF THE INVENTION

Known such antenna systems and methods for operating these antenna systems are suitable and designed for use in the automotive field.

In a preferred specific embodiment, such an antenna system has an antenna connected to an electronic device by an antenna cable. High-frequency signals received by the antenna are transmitted to the electronic device via the antenna cable, then are processed in the electronic device and played back in the desired manner. These are, for example, audio and video signals that are played back by suitable playback systems in the vehicle. The same is also true of navigation signals. Antenna systems are also known in which the opposite signal transmitting path is taken. These include, for example, telephone signals that are transmitted from the electronic device to the antenna through the antenna cable and are emitted by the antenna.

For optimum reception and/or optimum transmission of high-frequency signals, it is necessary for the antenna to be outside the vehicle. However, the electronic device is at a location farther away but still inside the vehicle, so that it is necessary to provide and install a long antenna cable between the electronic device and the antenna.

With active antennas, it is also necessary to provide a power supply, necessitating a power in addition to the antenna cable. If diagnostics are also to be performed via the active antenna, it is also necessary to install a third diagnostic cable from an additional diagnostic system or from the electronic device to the active antenna.

This plurality of cables requires a great outlay in terms of material and a high cost in terms of assembly.

Furthermore, the known active antennas of vehicles are not suitable and designed for car-to-car communication (C2C) or for car-to-X communication (C2X).

OBJECT OF THE INVENTION

The object of this invention is to provide an antenna system and a corresponding method of operating such an antenna system that are of simple design, easy to operate and allow both car-to-car communication and car-to-X communication.

SUMMARY OF THE INVENTION

This object is attained by an antenna system, according to the invention that is operated by a controller as well as switches that are triggered by the controller, and the system is switched by the switches between a receiving path and a transmitting path extending between the electronic device and the antenna.

The invention makes use of the idea that, for operation, communication, diagnostics. and optionally other services, the high-frequency signals required for these purposes are transmitted only through a single cable, namely the antenna cable. Depending on the high-frequency signals to be transmitted, they are transmitted through the antenna cable with no change (and these may be actual signals that being received or emitted) or they are fed into the antenna cable for the purpose of control and/or diagnostics and optionally for other purposes. A power supply for the antenna system, which may but need not be at a remote site away from the electronic device, may also be supplied through the antenna cable.

Depending on whether high-frequency signals are received by the antenna and are to be forwarded to the electronic device or whether high-frequency signals are transmitted by the electronic device to the antenna where they are emitted, the system is switched between a receiving path and a transmitting path by appropriate switches. This has the advantage that, depending on the intended purpose, additional electronic units such as an amplifier, for example, can be connected in the receiving path and/or the transmitting path.

Thus, the signal-processing and the signal path are optimized either by the electronic device to the antenna (transmitting path) or by the antenna to the electronic device (receiving path). Thus, for example, a low-noise amplifier that is characterized by an especially low-noise design in terms of the circuit technology is connected in the receiving path for example, this amplifier being characterized in terms of the circuit technology by an especially low noise level in order to be able to amplify extremely weak signals received by the antenna without having to convert the entire frequency band into lower frequencies at the same time. This increases the performance of the antenna system very specifically. The same thing is also true of signal transmission from the electronic device to the antenna when a power amplifier is connected in the transmitting path. This means that signal amplification takes place on a short path by the power amplifier before the signals are emitted via the antenna, to thereby improve the performance of the antenna system substantially with regard to its transmission. It is particularly advantageous if the antenna system is designed for receiving and transmitting signals in the car-to-car communication or the or the car-to-X communication (X=external systems such as laptops, smart phones, or even external systems outside of the vehicle, for example, traffic control systems, traffic jam detectors, traffic lights and so forth) designed in accordance with the Communications Standard 802.11p. This standard is suitable for mobile application of such antenna systems in vehicles in particular. Therefore, because of the standardization, a communication path (i.e. signal transmission of high-frequency signals) can be established between a vehicle and any other vehicle or any other system.

In a refinement of the invention, a transceiver connected to the antenna cable at the output end is also connected to the controller. This makes it possible to control certain services, i.e. actions that are to be triggered between the vehicle and an external system or another vehicle. Thus for example, a signal triggered by the electronic device may be fed into the antenna cable, transmitted to the controller via the transceiver and used by the controller to feed another signal into the antenna cable and then send via the transmitting path to the antenna for emission. The controller is capable of doing so for the case when the signal leaving the transceiver has been fed into the transmitting cable and is to be sent to the antenna via the transmitting path by activating the switches in such a way that the transmitting path (and not the receiving path) is connected. When this signal has been emitted, it is possible but not necessary to switch back to the receiving path. In general, activation of the switches by the controller always depends on whether the signals are supposed to be received by the antenna and forwarded to the electronic device through the antenna cable or whether signals from the electronic device or optionally also from the controller itself or from at least one other unit connected to the controller are to be forwarded via the transmitting path to the antenna for emission.

In a refinement of the invention, a frequency detector is connected to the controller, connected to the output end of the antenna cable. This frequency detector ensures detection of control signals of the electronic device that have been fed into the antenna cable and emission of a control pulse to the controller. This control pulse causes the controller to activate the switches in order to switch between the transmitting path and the receiving path. This frequency detector generates and/or detects control signals in order to activate the switches that switch between the transmitting path and the receiving path as a function of triggers of the electronic device and/or the antenna system. These triggering events are such that the electronic device feeds a control signal into the antenna cable to provide information to the controller about switching to the transmitting path because high-frequency signals are to be transmitted from the electronic device to the antenna through the antenna cable for emission there. The same is also true for the case when high-frequency signals received from the antenna by the antenna system are to be transmitted to the electronic device through the receiving path and the antenna cable.

With the antenna system according to the invention, it is thus possible not only to transmit high-frequency signals between the antenna and the electronic device (so-called useful signals) but also to feed control signals, diagnostic signals, optionally power and possibly also additional signals into the antenna cable, and to transmit them, so that only this antenna cable can transmit signals between the antenna system with its antenna and the electronic device at a greater distance away (remote). The invention thus makes use of the effect that the antenna cable is the only transmission medium between the electronic device and the antenna that is used for various types of signal transmission (useful signals, control signals, diagnostic signals, electric power and the like) and it is thus advantageously possible to eliminate the use of a separate cable for each of the purposes mentioned. It is therefore possible to avoid the use of complex cabling in the vehicle, and the antenna system with its antenna that is a great distance away from the electronic device can be operated by using only a single antenna cable, usually a coaxial cable. This advantageously reduces both the cost of materials and the assembly costs.

Similarly, a method according to the invention for operating an antenna system is described in the other independent patent claim and the dependent claims. The same descriptions and the same advantages as those with respect to the antenna system described above are also applicable here.

BRIEF DESCRIPTION OF THE DRAWING

An embodiment of an antenna system, which can also be operated according to the method according to the invention, is described below and explained with reference to the single FIGURE.

SPECIFIC DESCRIPTION OF THE INVENTION

An antenna system 1, inasmuch as it is shown in detail, has an antenna 2. The antenna system 1 is connected directly to the antenna 2 or only via a very short signal path and is mounted in a certain place in the vehicle, usually outside of the vehicle. The antenna system 1 is connected to an electronic device 4 (illustrated only schematically) via an antenna cable 3, preferably coaxial cable. It is important here that the site of installation of the antenna system 1 and the site of installation of the electronic device 4 are at a substantial distance from one another. This distance is in the range of a meter or so, depending on the size of the vehicle. Therefore, the basic idea of the invention that has already been described, namely to use a single antenna cable 3 between the electronic device 4 and the antenna system 1, is especially important.

A controller 5 (microcontroller) that has various signal inputs and signal outputs is provided in the antenna system. Furthermore, switches 6 and 7 are provided in the signal path between the antenna 2 and the electronic device 4, so that it is possible to switch between a receiving path 8 and A transmitting path 9 by these switches 6 and 7. The switches 6 and 7 are connected to the controller 5 and are activated by switching pulses of the controller 5. They always switch simultaneously, so that, as shown in the FIGURE, for example, either only the receiving path 8 is connected through (or after switching, the transmitting path 9 is connected through). Amplifiers 10 and 11 are connected in the two paths 8 and 9 in accordance with the application for the respective paths. In a particularly advantageous manner, a low-noise amplifier 10 (LNA) is connected to the receiving path 8 and/or a power amplifier 11 (PA) is connected to the receiving path 9. One or both of the amplifiers 10 and 11 may optionally be connected to the controller 5. If they are connected, then the input LNA EN of the amplifier 10 is connected to the corresponding input LNA EN of the controller 5. The controllable power amplifier 11 may be connected to the input PA EN of the controller 5 by its output PA EN.

Furthermore, the two amplifiers 10 and 11 or just one amplifier (only the amplifier 11, as shown in the FIGURE) may be equipped with a diagnostic interface (detect) and connected via a corresponding input (detect) of the controller 5.

In addition, a high-pass filter 12 is connected in the transmitting path between the electronic device 4 and the antenna 2. Furthermore, there is also a band-pass filter 13 in the signal path from the antenna cable 3 to the controller 5 with a transceiver 14. The transceiver 14 is a transmission unit for the radio-controlled central locking system of the vehicle, for example.

On the basis of the functioning of the radio-controlled central locking system, the fundamental idea of the car to X (X=remote operation for the radio-controlled central locking system) is described. If the receiving path 8 has been connected and a triggering signal of the remote control for the radio-controlled central locking system has been received by the antenna 2, then this signal is relayed via the band-pass filter 13 and the transceiver 14 to the controller 5.

This signal is filtered, demodulated and decoded in the controller 5 and then fed back onto the antenna cable 3 via the transceiver 14; then it goes to the electronic device 4, where it triggers an action (for example, locking or unlocking a door). This control signal, which is fed into the antenna cable 3 in this way, cannot be emitted because it is blocked by the high-pass filter 12. If the receiving path 8 is not connected through at the moment when a triggering signal of the remote radio-controlled operation should be received by the antenna 2 and instead the transmitting path 9 is connected through, then it is conceivable that the controller 5 may switch very, very briefly between the receiving path 8 and the transmitting path 9 in a suitable way in order to ensure that, in any case, when a high-frequency signal is received by the antenna 2 and the transmitting path 9 should be connected at this time, it is always possible to switch briefly to the receiving path 8. A frequency detector 16 is connected to the controller 5 by a band-pass filter 15 for this purpose, such that the controller ensures rapid switching of the switches 6 and 7. The triggering signals of the electronic device 4, signaling whether the switches 6 and 7 should connect the receiving path 8 or the transmitting path 9, pass through the band-pass filter 15 to the frequency detector 16 that is in turn connected to the controller 5 and sends corresponding control signals to the switches 6 and 7 for the switching.

Finally, there is a power supply 18 by a low-pass filter 17 for the antenna system 1. The power supply 18 is, for example, an energy storage system or a battery charged by signals fed into the antenna cable 3. The power supply 18 supplies power to the active unit of the antenna system 1, in particular its controller 5, its transceiver 14 and its frequency detector 16.

As shown in the schematic of the FIGURE, suitably tuned filters (high-pass filter 12, band-pass filter 13, band-pass filter 15 and low-pass filter 17) ensure that the antenna cable 3 can be used for various purposes by a useful signal and several modulated control signals, diagnostic signals and/or power supply signals. Thus, for example, the high-pass filter 12 ensures that only signals in the range of more than 1 gigahertz can be transmitted through the antenna cable 3. The band-pass filter 13 ensures that only signals in the range around 433 megahertz can be fed into the antenna cable. Likewise, the band-pass filter 15 ensures that only signals in the range of 20 megahertz can pass through that filter. Finally, the low-pass filter 17 ensures that only signals substantially below 40 megahertz can pass through the antenna cable 3 to the power supply 18. For the sake of thoroughness, it should be pointed out that the aforementioned frequency specifications, which are also indicated in the FIGURE, are given merely as examples and can be adapted to the frequencies used for actual signals and control signals.

As an additional option, the controller 5 may have BLE (Bluetooth low energy) function. This means that the power supply 18 can be energized not only via the antenna cable 3 but additionally or solely via a power supply path 19.

With respect to the controller 5, it should also be pointed out that it has a general purpose input/output (GPIO), an analog-digital converter (ADC), a serial peripheral interface (SPI) and an interrupt interface (INTO) according to this embodiment. For example, interrupts are triggered by the controller 5 through this interrupt interface when the value applied to a certain input of the controller 5 is changed from high to low (or vice versa), a predefined period of time has elapsed or a serial transmission is concluded.

The invention claimed is:

1. An antenna system comprising:
   an antenna;
   an electronic device remote from the antenna;
   a single coaxial antenna cable connected to the electronic device;
   a first switch connected to the cable and only through the cable to the electronic device;
   a second switch connected to the antenna;
   a transmitting path extending between the first and second switches;
   a power amplifier in the transmitting path;
   a receiving path separate from the transmitting path and also extending between the first and second switches; and
   a low-noise amplifier in the receiving path, the first and second switches being jointly movable between receiving and transmitting positions in each of which the cable is connected to a respective one of the paths and therethrough to the antenna such that in the receiving positions the receiving path and the low-noise amplifier are connected between the antenna cable and the antenna and in the transmitting positions the transmitting path and the power amplifier are connected between the antenna cable and the antenna and high-frequency signals can bidirectionally between the electronic device and the antenna through the single coaxial antenna cable;
   a controller operating the switches such that the switches switch the system between the receiving path and the transmitting path between the electronic device and the antenna; and
   a power supply connected through the coaxial cable to the electronic device.

2. The antenna system according to claim 1, further comprising:
   a transceiver connected to the output end of the antenna cable and to the controller.

3. The antenna system according to claim 1, further comprising:
   a frequency detector connected to the output end the antenna cable and to the controller.

* * * * *